United States Patent [19]
Yeh

[11] Patent Number: 5,853,529
[45] Date of Patent: Dec. 29, 1998

[54] MACHINE FOR CUTTING AND FUSING PLASTIC PLATES

[76] Inventor: Tien-Fu Yeh, No. 53, Alley 87, Lane 538, Sec. 4, Anho Rd., Tainan, Taiwan

[21] Appl. No.: 938,861

[22] Filed: Sep. 26, 1997

[51] Int. Cl.[6] ................................................. B32B 31/00
[52] U.S. Cl. .................. 156/512; 156/304.6; 156/499; 156/507; 156/558
[58] Field of Search .......................... 156/304.1, 304.5, 156/304.6, 499, 502, 507, 512, 558

[56] References Cited

U.S. PATENT DOCUMENTS

| | | | |
|---|---|---|---|
| 4,552,602 | 11/1985 | Landsness | 156/304.1 |
| 4,743,412 | 5/1988 | Kuse | 264/445 |
| 5,314,568 | 5/1994 | Ryan | 156/504 |
| 5,415,722 | 5/1995 | Yeh | 156/512 |

Primary Examiner—James Sells
Attorney, Agent, or Firm—Abelman, Frayne & Schwab

[57] ABSTRACT

A machine for cutting and fusing plastic plates includes a feeding means for feeding the plastic plates toward a first compressing device having a first supporting plate being flush with the feeding means, a first compressing plate controlled by two first cylinders disposed beside the first supporting plate, a cutting device disposed above the first compressing means and having a disk blade driven by a motor, the disk blade is moved with a belt movably reeved around pulleys disposed to a frame so as to cut the plastic plate fed by the feeding means. A second compressing means is movably connected to the first supporting plate and has a second supporting plate being flush with the first supporting plate and a second compressing plate which is connected to two second cylinders disposed beside the second supporting plate. A fusing means has two shafts and one of the shafts is driven by a motor, two transmitting belts reeved around the two shafts and having a heating blade connected therebetween so as to fusingly connected two plastic plates.

4 Claims, 15 Drawing Sheets

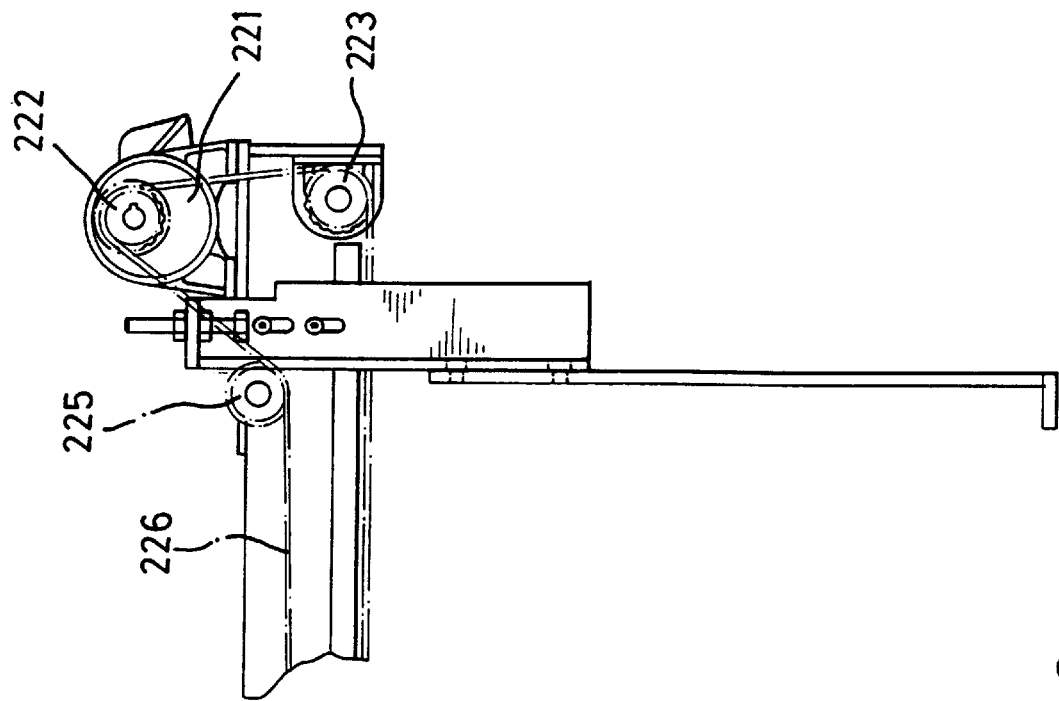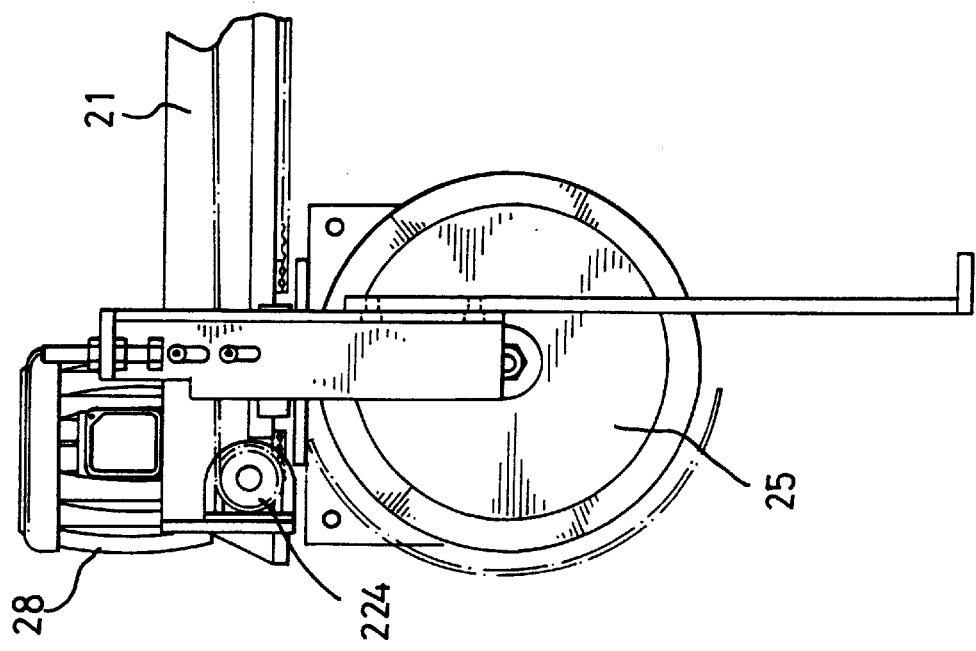
FIG.3

MACHINE FOR CUTTING AND FUSING PLASTIC PLATES

BACKGROUND OF THE INVENTION

1. Field of the Invention

The present invention relates to a machine for cutting and fusing plastic plates such as polyethylene (PE) or ethylene vinyl acetate (EVA), more particularly, to the machine having a rotatable disk blade which is moved to cut the plates into sections which are connected together by fusing by a heating blade.

2. Brief Description of the Prior Art

A latest automatic machine for cutting, fusing, and reeling raw material plates of plastic material known to Applicant is Applicant's U.S. Pat. No. 5,415,722, issued on May 16, 1995. The patent includes a front and a rear healing blade heating blade wherein the front heat blade is only used to cut a front irregular end of the plastic plate and the rear end of the plastic plate is cut by the rear heating blade which is also to connect two plastic plates by fusing. However, to cut the plastic plate, the heating blade is heated to 800 to 1000 degrees Celsius, and to connect the two plastic plates by fusing, the heating blade is heated only to about 400 degrees Celsius. Therefore, the rear heat blade has to be controlled to vary its temperature in order to proceed two different functions, this takes too much time. Furthermore, the higher the temperature the heat blade has, the lower stiffness it will be, so that the cutting process has to be operated very slowly and the low stiffness heat blade cannot cut the plastic plate straight so that rough end surface is defined after cutting. Such a rough surface of the plastic plate cannot be connected to another properly so that bad quality products will occur. Similarly, when cutting the plastic plate, the material could be fused and adhered to the heat blade.

The present invention intends to provide an improved machine for cutting and fusing plastic plates to mitigate and/or obviate the above-mentioned problems.

SUMMARY OF THE INVENTION

The present invention provides a machine for cutting and fusing plastic plates, and comprises a feeding means for feeding the plastic plates, a first compressing device disposed next to the feeding means and having a first supporting plate being flush with the feeding means and at least one first compressing plate which is controlled by at least one first cylinder disposed beside the first supporting plate. A cutting means is disposed next to the first compressing means and has a frame transversely disposed above the first compressing means and a first motor disposed to one of two ends of the frame. A first pulley is driven by the first motor and the other end of the frame has a second pulley disposed thereto so that a belt is movably reeved around the first and the second pulley. A base member is fixedly connected to the belt and a disk blade which is driven by a second motor.

The machine further includes a second compressing means movably connected to the first supporting plate and the second compressing means has a second supporting plate being flush with the first supporting plate and a second compressing plate which is connected to at least one second cylinder disposed beside the second supporting plate.

A fusing means is disposed next to the second compressing means and has two shafts. One of the shafts is driven by a third motor and two transmitting belts are respectively reeved around the two shafts. The two transmitting belts each have a securing member disposed thereto so that a heating blade is connected between the two securing members.

It is an object of the present invention to provide a machine for cutting and fusing plastic plates, and which has a rotatable disk blade to cut the plastic plates.

It is another object of the present invention to provide a machine for cutting and fusing plastic plates, and which has a second compressing means to snugly connect two respective ends of two plastic plates before being fused.

It is a further object of the present invention to provide a second compressing means which can be lowered and one end thereof is flush with a vertical plane on which a heating blade is located so that contact of one end of the plastic plate or the end of the second compressing means ensures the end of the plastic plate to be fused is at a correct position.

Other objects, advantages, and novel features of the invention will become more apparent from the following detailed description when taken in conjunction with the accompanying drawings.

BRIEF DESCRIPTION OF THE DRAWINGS

FIG. 3 is a side elevation view to show the cutting means of the invention;

DETAILED DESCRIPTION OF THE PREFERRED EMBODIMENT

Figure 1:
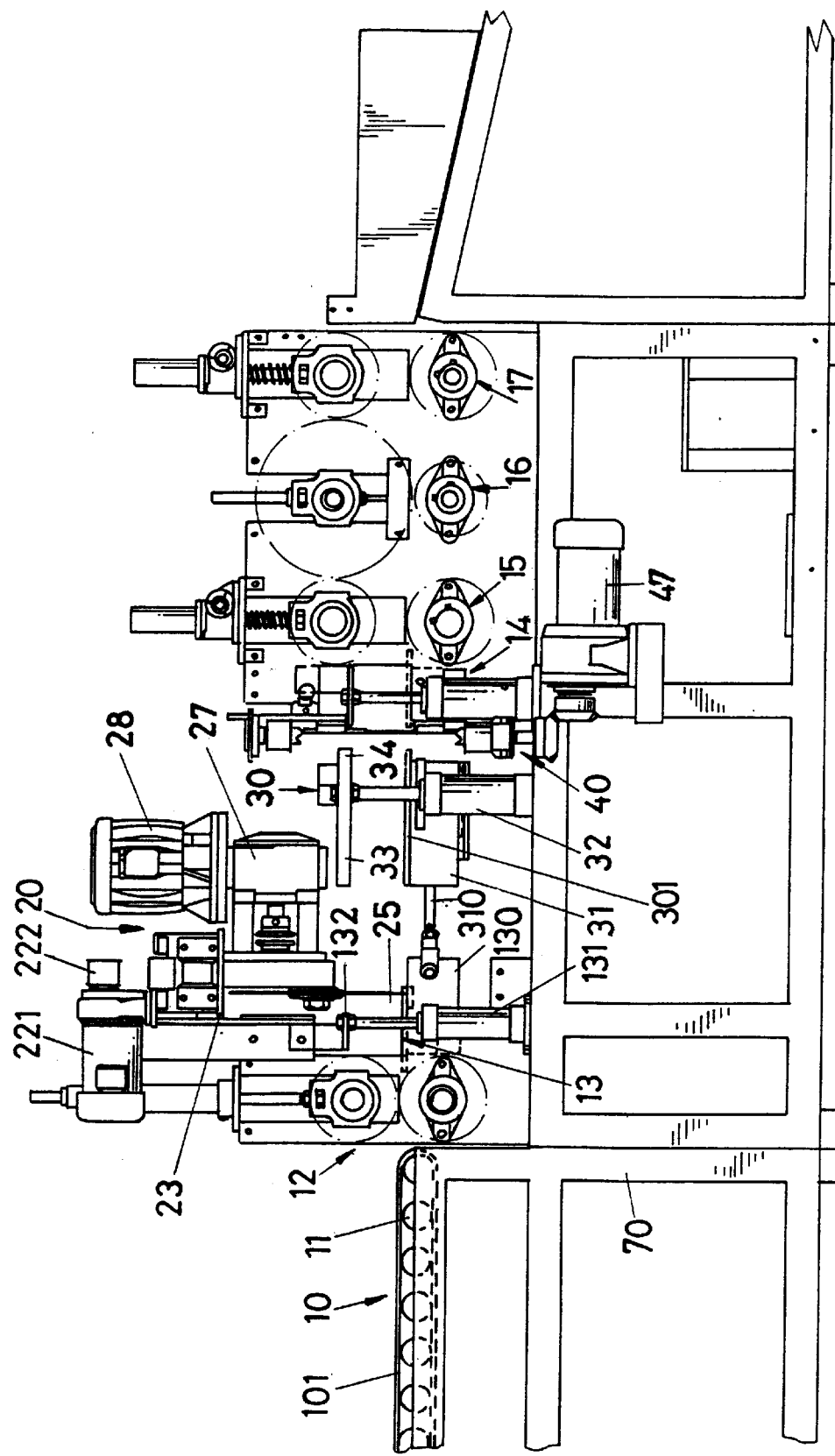
FIG. 1 is a side elevational view of a machine for cutting and fusing plastic plates in accordance with the present invention.
Figure 2:
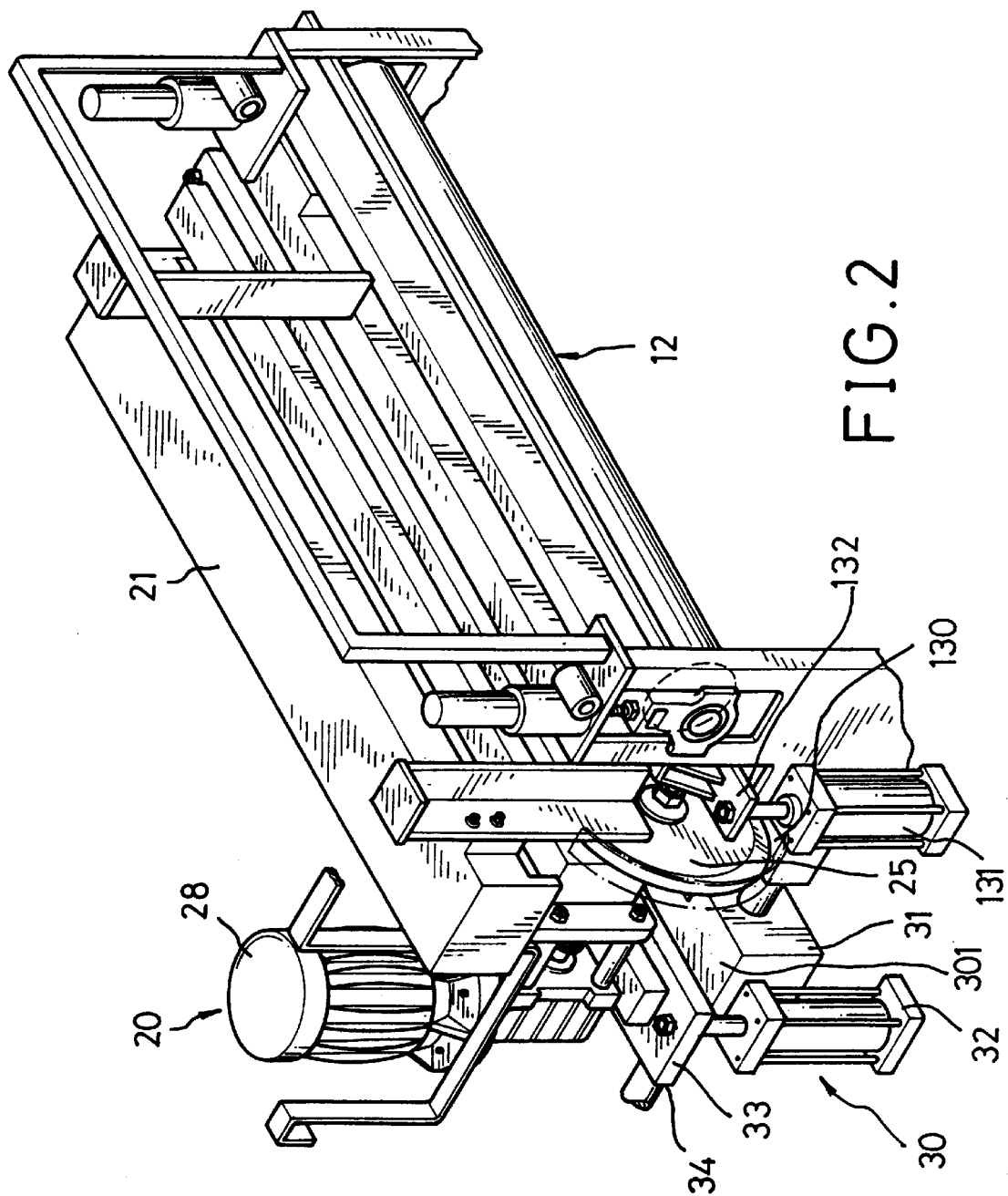
FIG. 2 is a perspective view of a part of the machine and shows a second compressing means and a cutting means of the present invention.

Referring to the drawings and initially to FIGS. 1 and 2, a machine for cutting and fusing plastic elates in accordance with the present invention generally includes a main frame 70 on which a feeding means 10 for feeding plastic plates 50, 60 (see FIG. 10), such as polyethylene (PE) or ethylene vinyl acetate (EVA) is disposed, the feeding means 10 including a plurality of rollers 11 around which a conveyer belt 101 is movably reeved. A middle transmitting roller assembly 12 is disposed next to the feeding means 10 so as to transport the plastic plates 50, 60 fed by the feeding means 10.

A first compressing device 13 is disposed next to the middle transmitting roller assembly 12 and has a first supporting plate 130 being flush with the feeding means 10 and at least one first compressing plate 132 which is controlled by two first cylinders 131 (only one is shown) disposed beside the first supporting plate 130 so that when the first cylinders 131 are actuated, the first compressing plate 132 is lowered to press on the plastic plates 50, 60.

Figure 4:
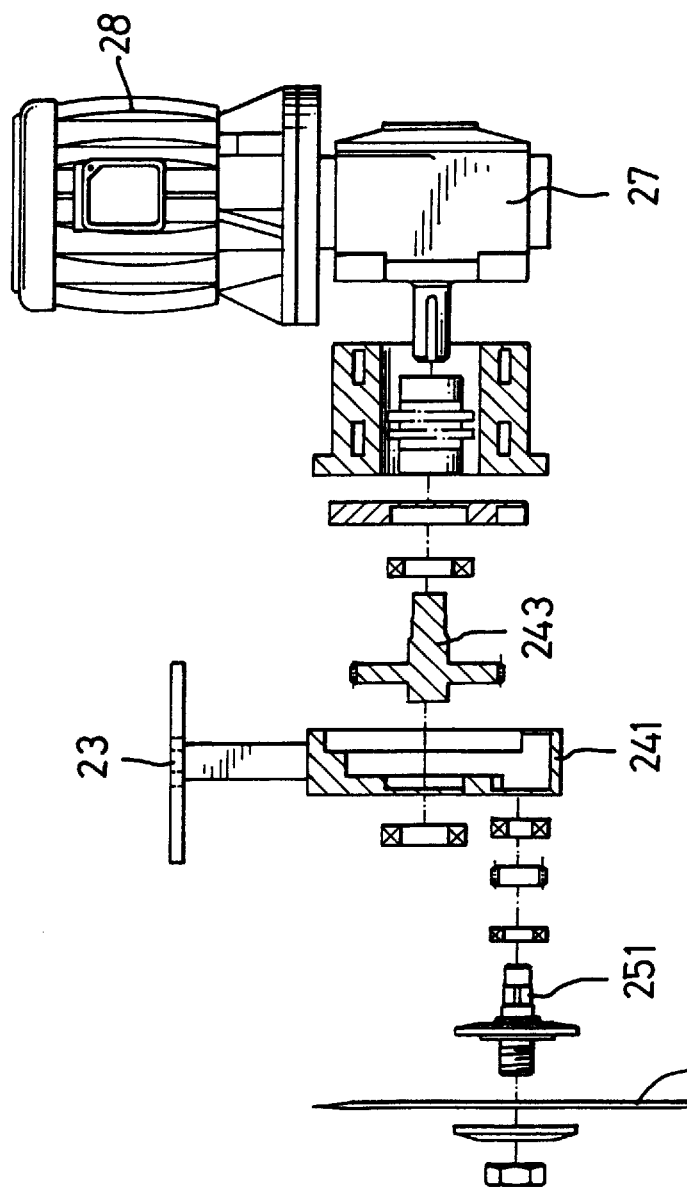
FIG. 4 is an exploded, partly in section view of the cutting means in accordance with the present invention.
Figure 5:
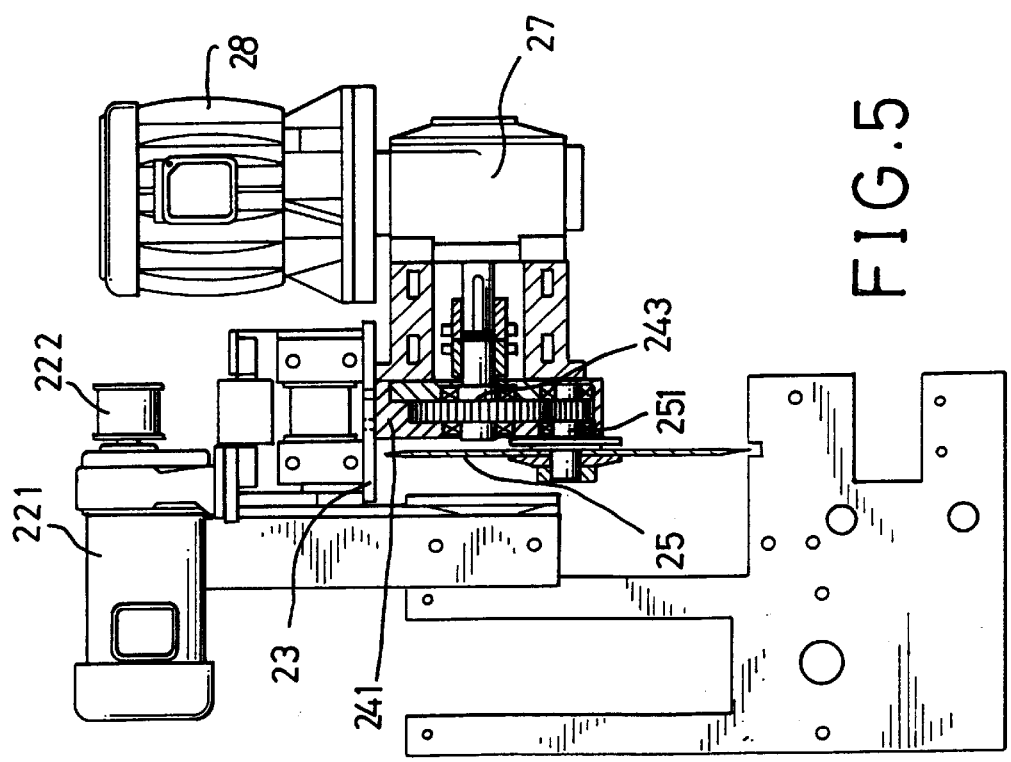
FIG. 5 is a side elevational view, partly in section, of the cutting means shown in FIGS. 3 and 4.

Referring to FIG. 3, a cutting means 20 is disposed next to the first compressing means 13 and has a frame 21 transversely disposed above the first compressing means 13. A first motor 221 is disposed to one of two ends of the frame 21. A first pulley 222 is driven by the first motor 221 and two mediate pulleys 223, 225 respectively disposed below the first pulley 222. The other end of the frame 21 has a second pulley 224 disposed thereto so that a belt 226 is movably reeved around the first pulley 222, the two mediate pulleys 223, 225 and the second pulley 224. Referring to FIGS. 4 and 5, the belt 226 has a base member 23 fixedly connected thereto which is connected to a connector 241 in which a first and a second power transmitting rod 243, 251 respectively extend from two opposite sides thereof. The first power transmitting rod 243 is connected to a gear box 27 which is connected to a second motor 28. The second power transmitting rod 251 is fixedly connected to a disk blade 25 which is therefore driven by the second motor 28. Accordingly, when the belt 226 is moved, the disk blade 25 is moved therewith.

Referring back to FIG. 1 and FIG. 2, a second compressing means 30 is movably connected to the first supporting plate 130 and has a second supporting plate 301 being flush with the first supporting plate 130. The second supporting plate 301 is disposed to a movable cylinder 31 which has a cylinder rod 310 connected to the first supporting plate 130. A second compressing plate 33 is connected to two second cylinders 32 (only one is shown in FIGS. 1 and 2) disposed beside the second supporting plate 301, so that when the movable cylinder 31 is actuated, the whole second compressing means 30 is moved.

Figure 6:
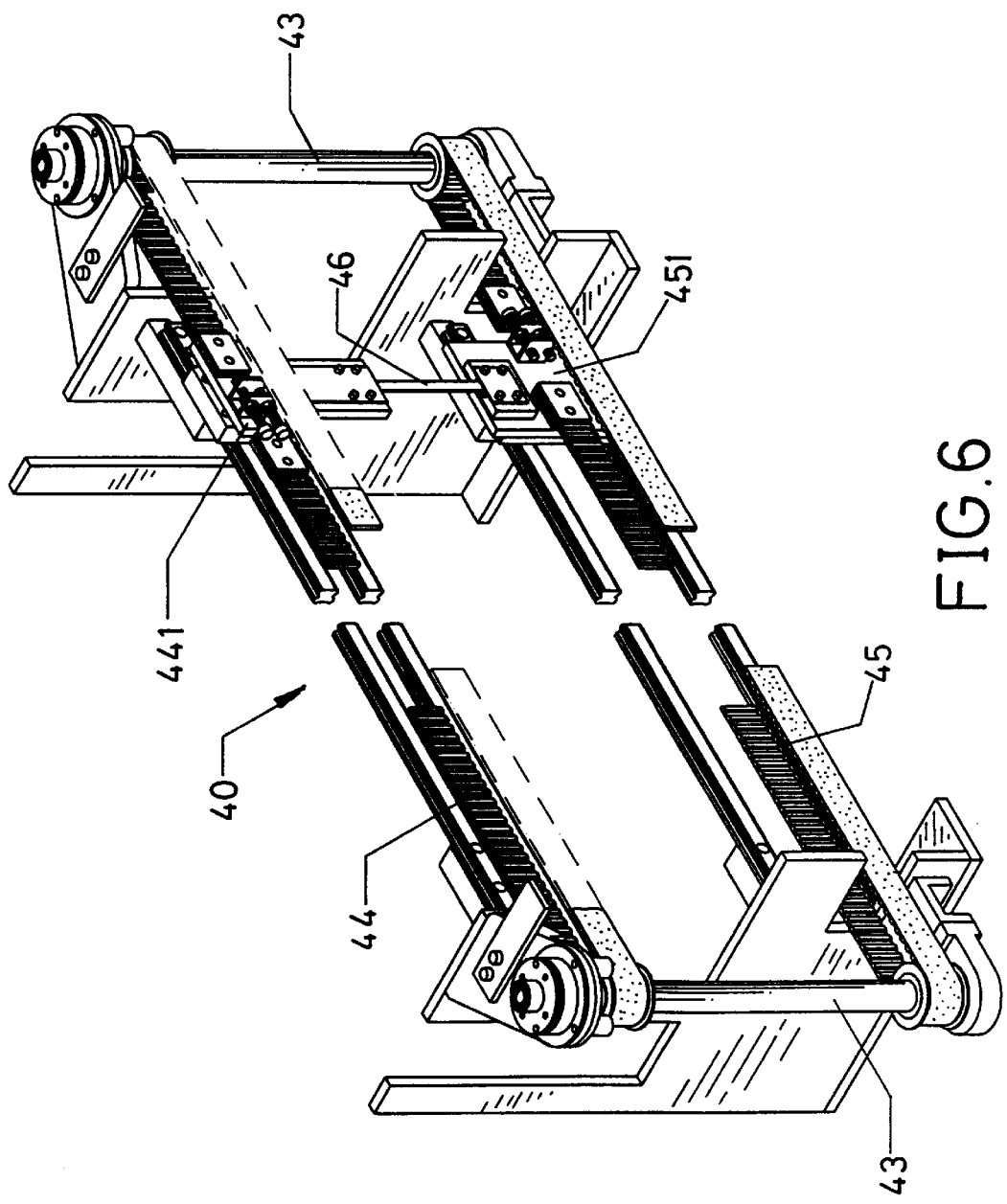
FIG. 6 is a perspective view of a fusing means of the machine of the present invention.
Figure 7:
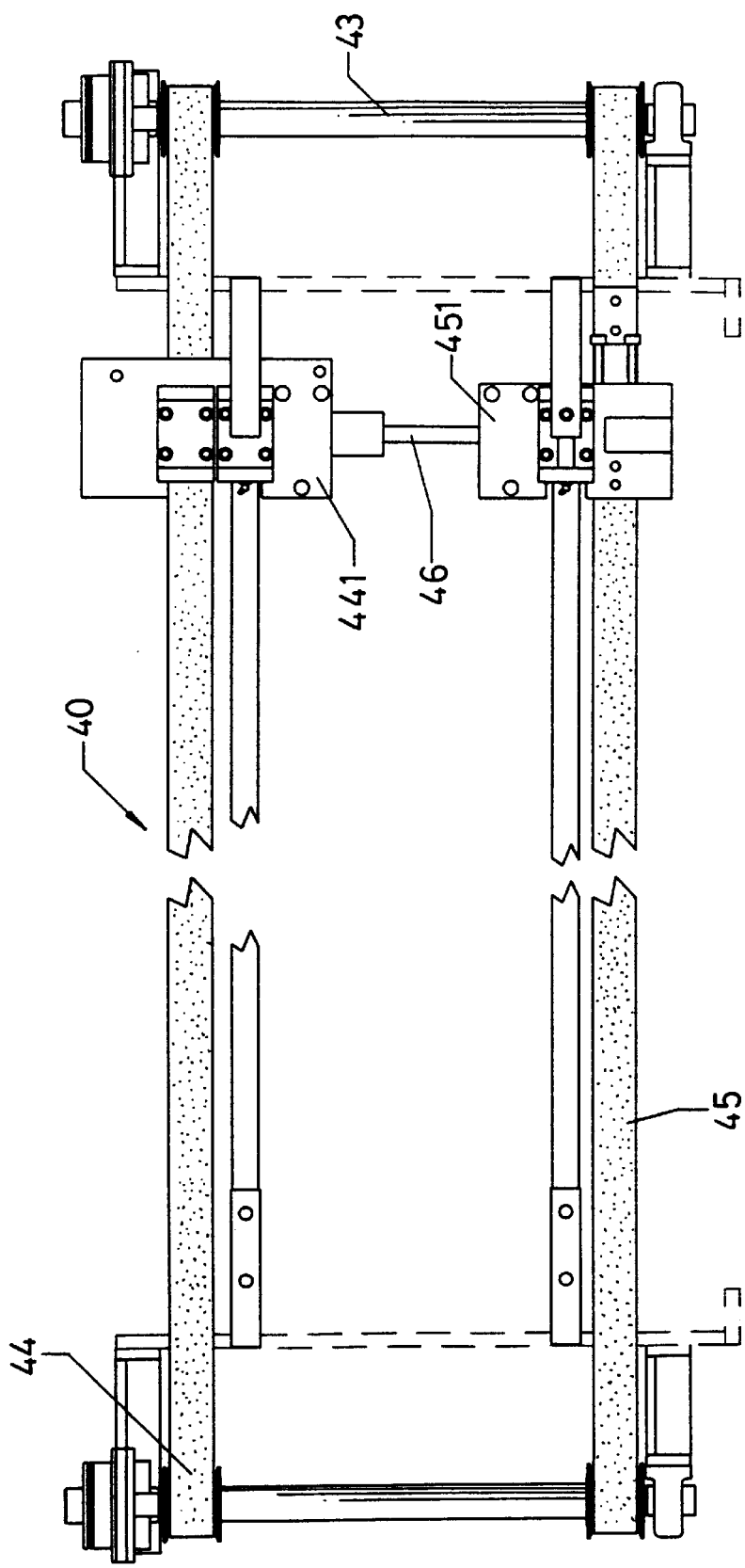
FIG. 7 is a side elevational view of the fusing means as shown in FIG. 6.
Figure 8:
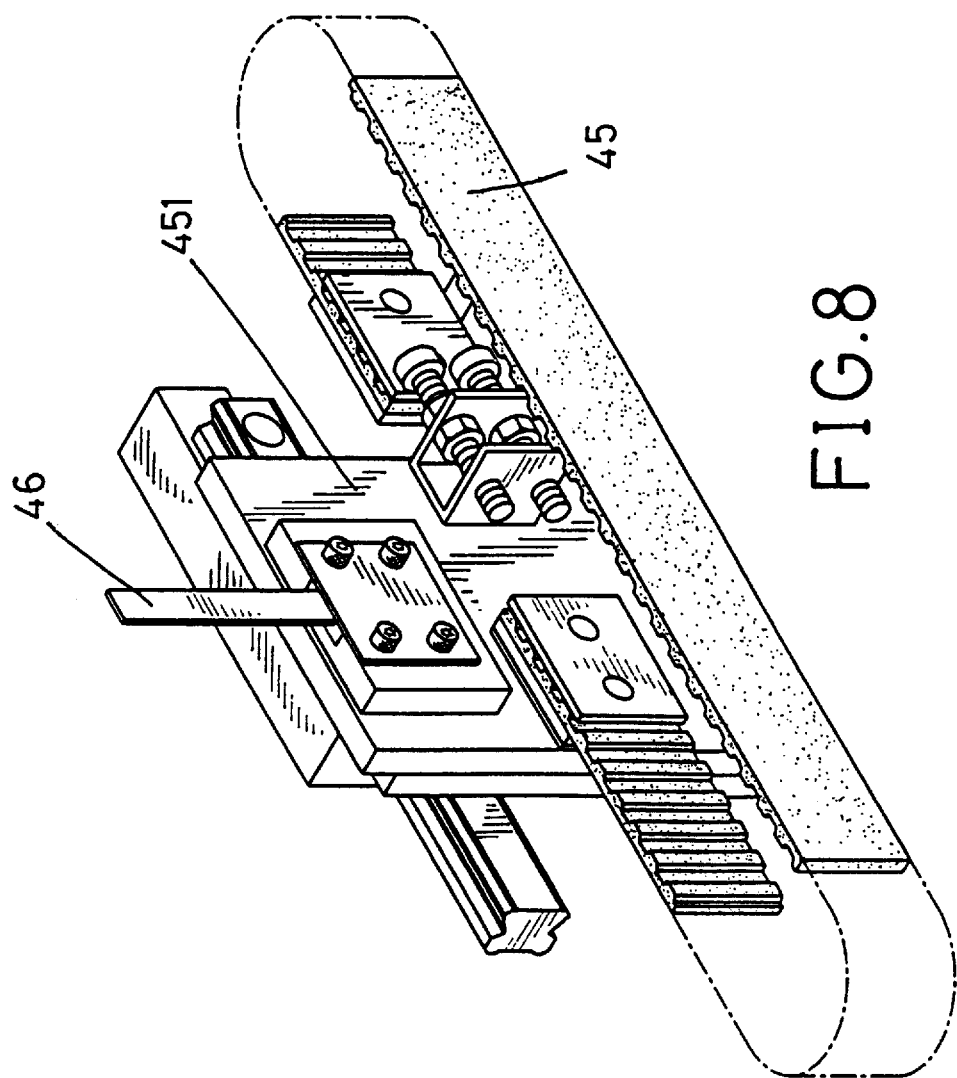
FIG. 8 is a perspective view of a part of the fusing means and shows a heating blade is fixedly disposed to a securing member on a transmitting belt thereof.
Figure 9:
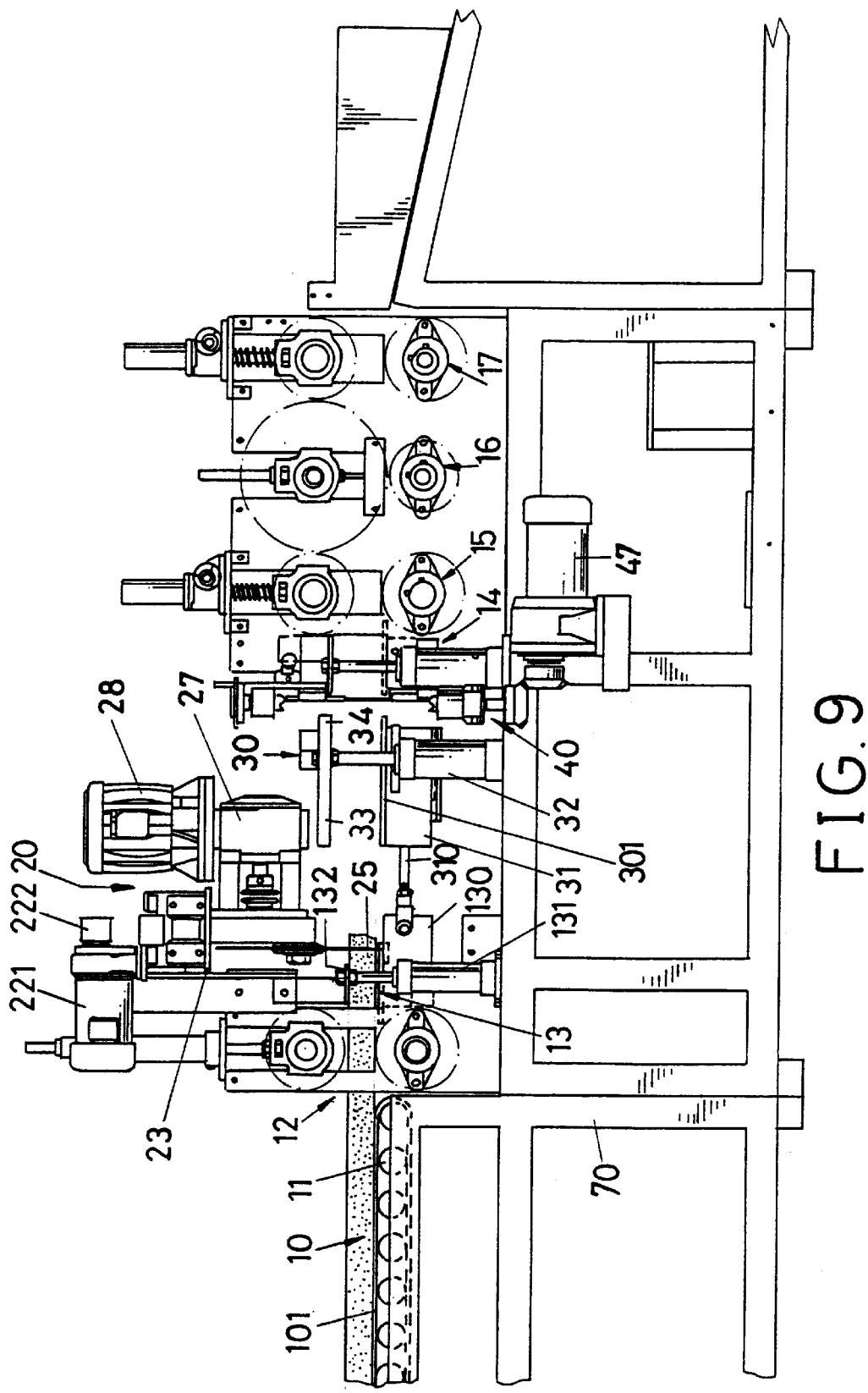
FIG. 9 is a side elevational view of the machine of the present invention, wherein the cutting means is cutting a front irregular end of a plastic plate.

Referring to FIGS. 6 through 8, a fusing means 40 is disposed next to the second compressing means 30 and has two shafts 43, one of the shafts 43 being driven by a third motor 47 (see FIG. 9). Two transmitting belts 44, 45 are respectively reeved around the two shafts 43 and each have a securing member 441/451 disposed thereto as shown in FIG. 6. A heating blade 46 is connected between the two securing members 441, 451. Referring to FIG. 9, third compressing means 14 is disposed adjacent the fusing means 40 and comprises a cylinder 141 and a compressing plate 142 connected to the cylinder 141. The machine further has three sets of transportation assembly 15, 16, 17 disposed next to the third compressing means 14 in sequence.

Figure 10:
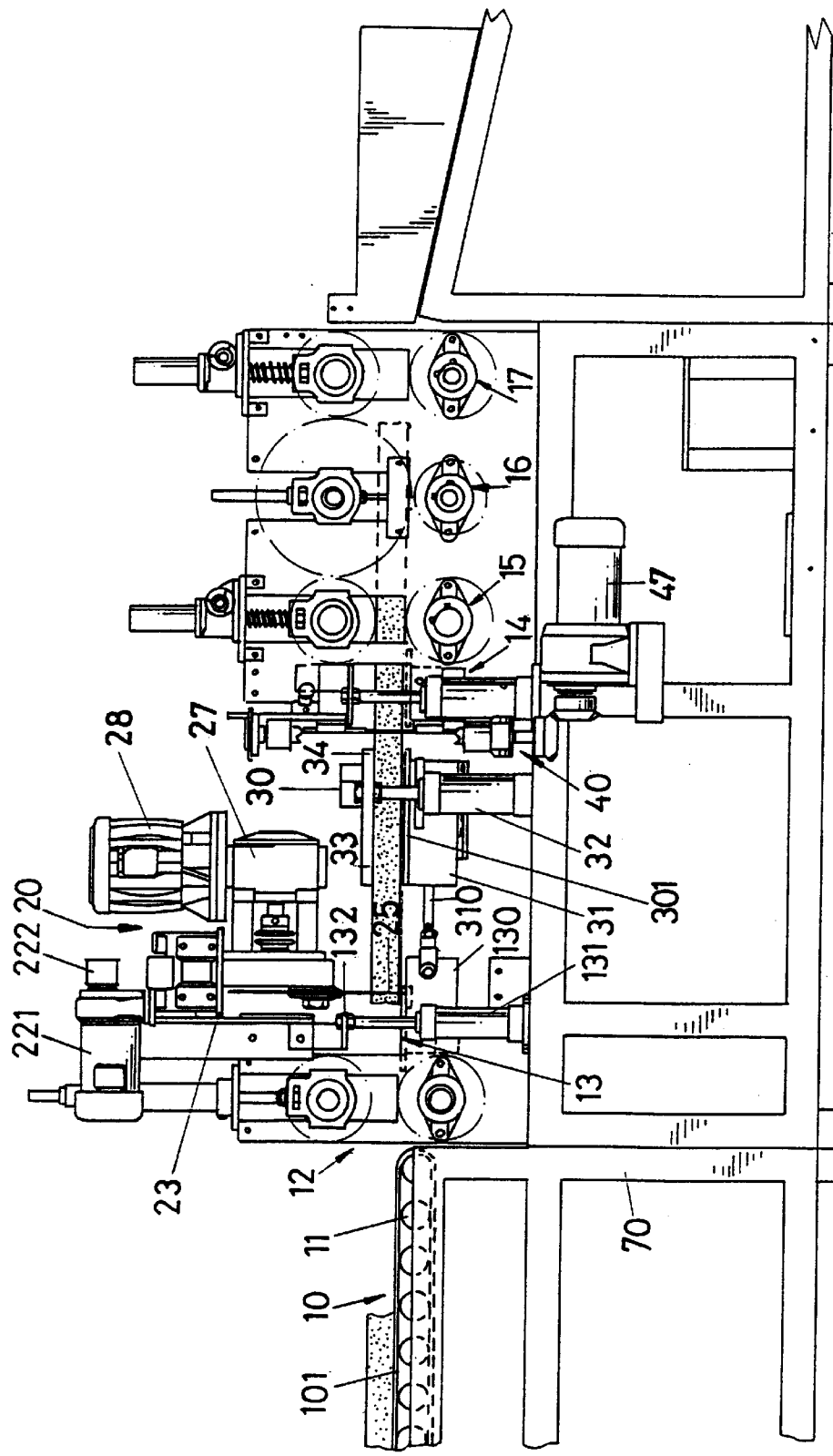
FIG. 10 is a side elevational view of the machine of the present invention, wherein the cutting means is cutting a rear irregular end of a first plastic plate.

Referring now to FIGS. 9 and 10, the first plastic plate 50 is fed by the feeding means 10 and the middle transmitting roller assembly 12, and when a front irregular end of the first plastic plate 50 extends slightly over the position where the disk blade 25 is located, the first compressing plate 132 is lowered to press the first plastic plate 50. The belt 226 is then moved together with the cutting means 20 and the disk blade 25 is rotated to cut the front irregular end of the first plastic plate 50 and the first compressing plate 132 is then raised. The first plastic plate 50 is then moved toward the fusing means 40 and when a rear irregular end of the first plastic plate 50 is located in front of the disk blade 25, the second compressing means 30 is actuated to press the first plastic plate 50 and the rear irregular end of the first plastic plate 50 is cut by the disk blade 25.

Figure 11:
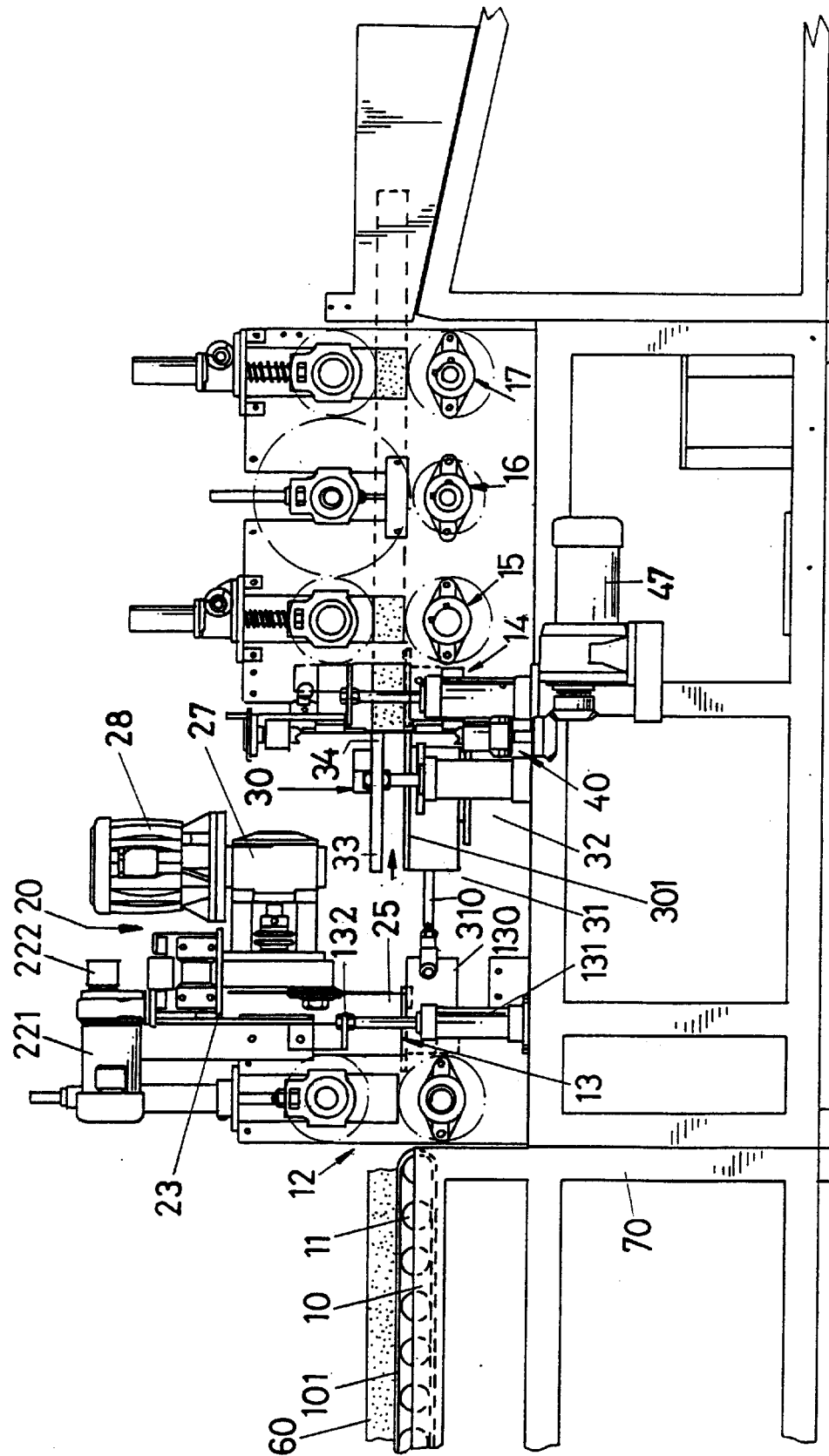
FIG. 11 is a side elevational view of the machine of the present invention, wherein the second compressing means is lowered and contacts the rear end of the first plastic plate.
Figure 12:
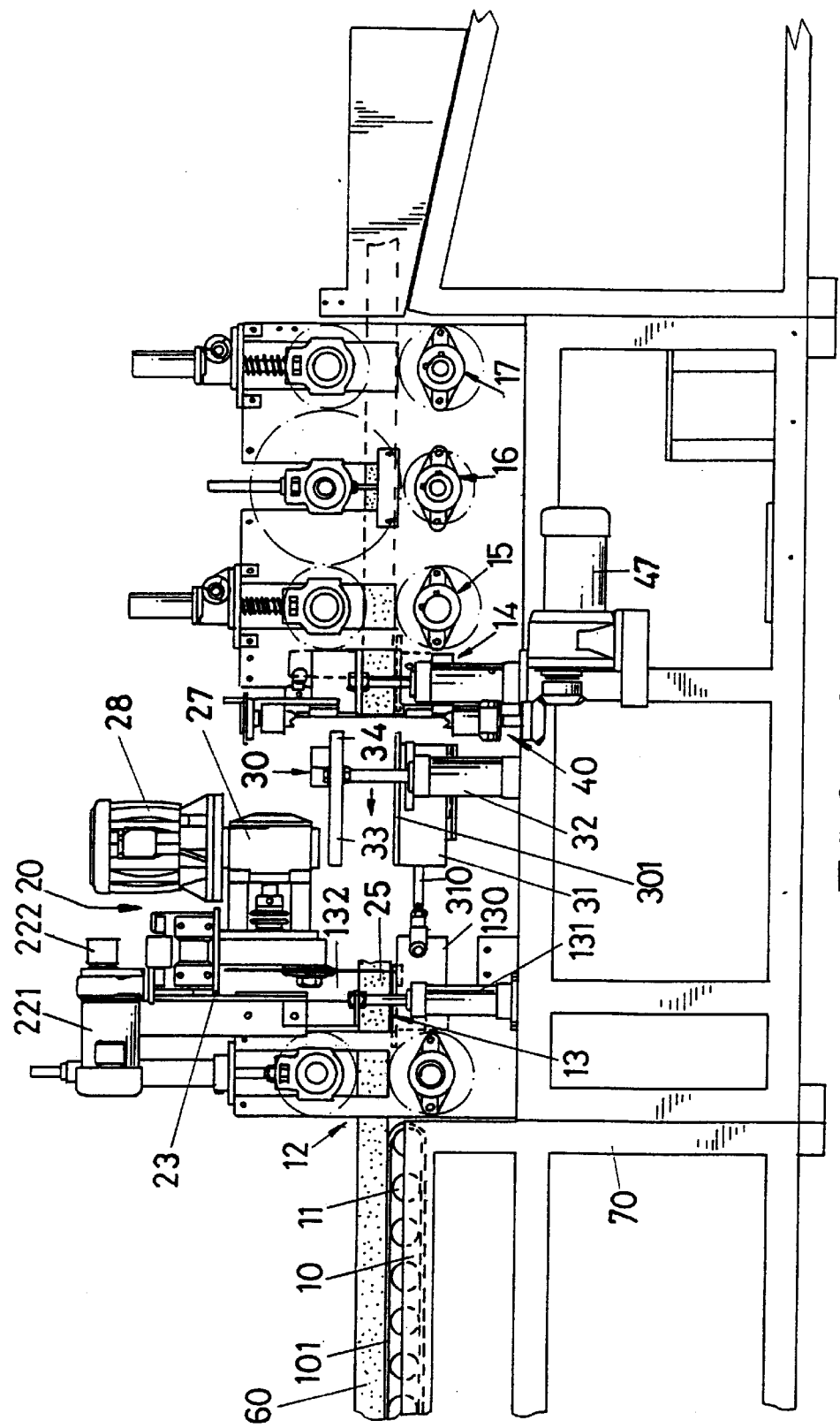
FIG. 12 is a side elevational view of the machine of the present invention, wherein the cutting means is cutting a front irregular end of a second plastic plate.
Figure 13:
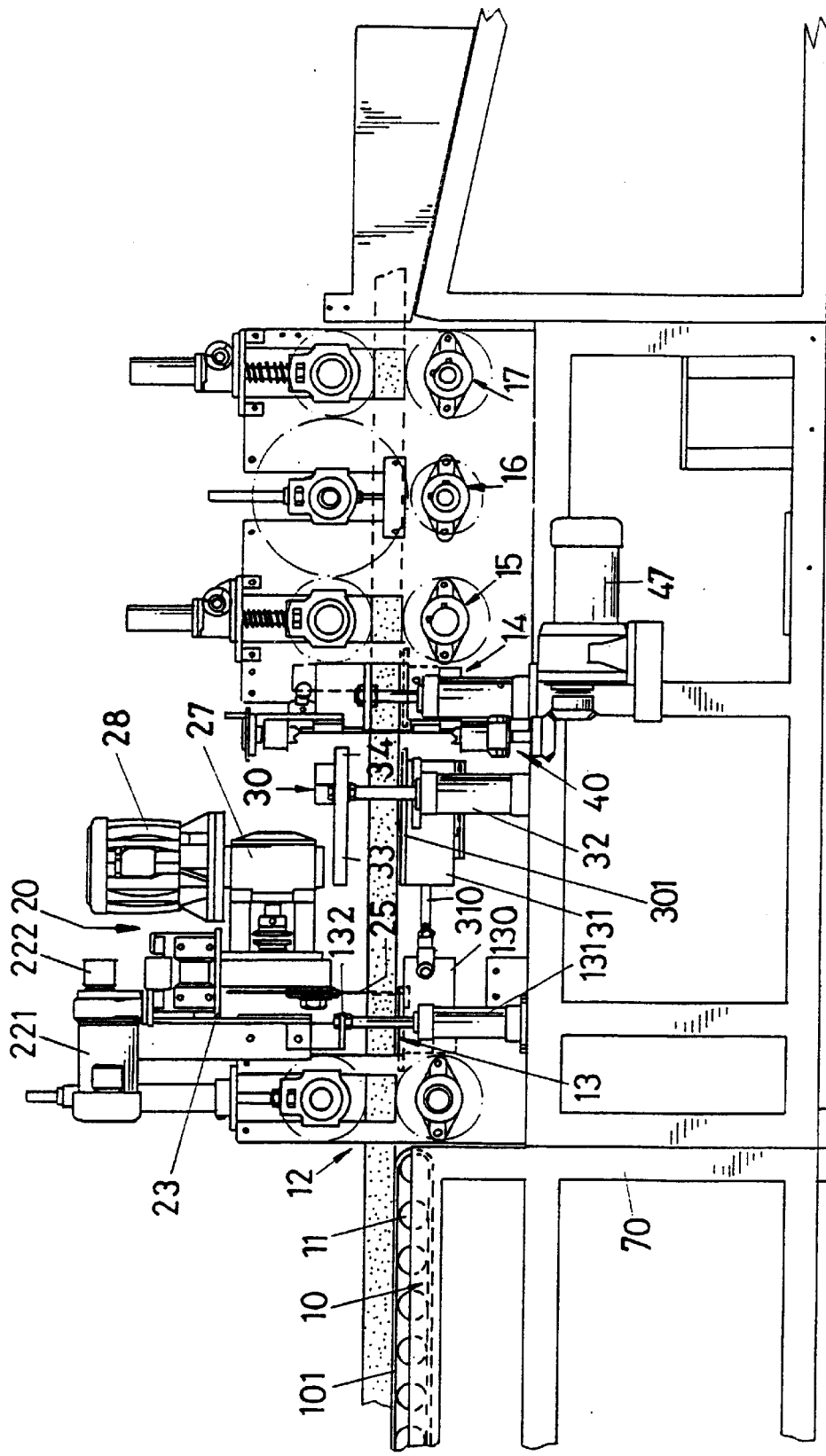
FIG. 13 is a side elevational view of the machine of the present invention, wherein the front end of the second plastic plate is moved to contact the rear end of the first plastic plate at a position where a heating blade of the cutting means is located.
Figure 14:
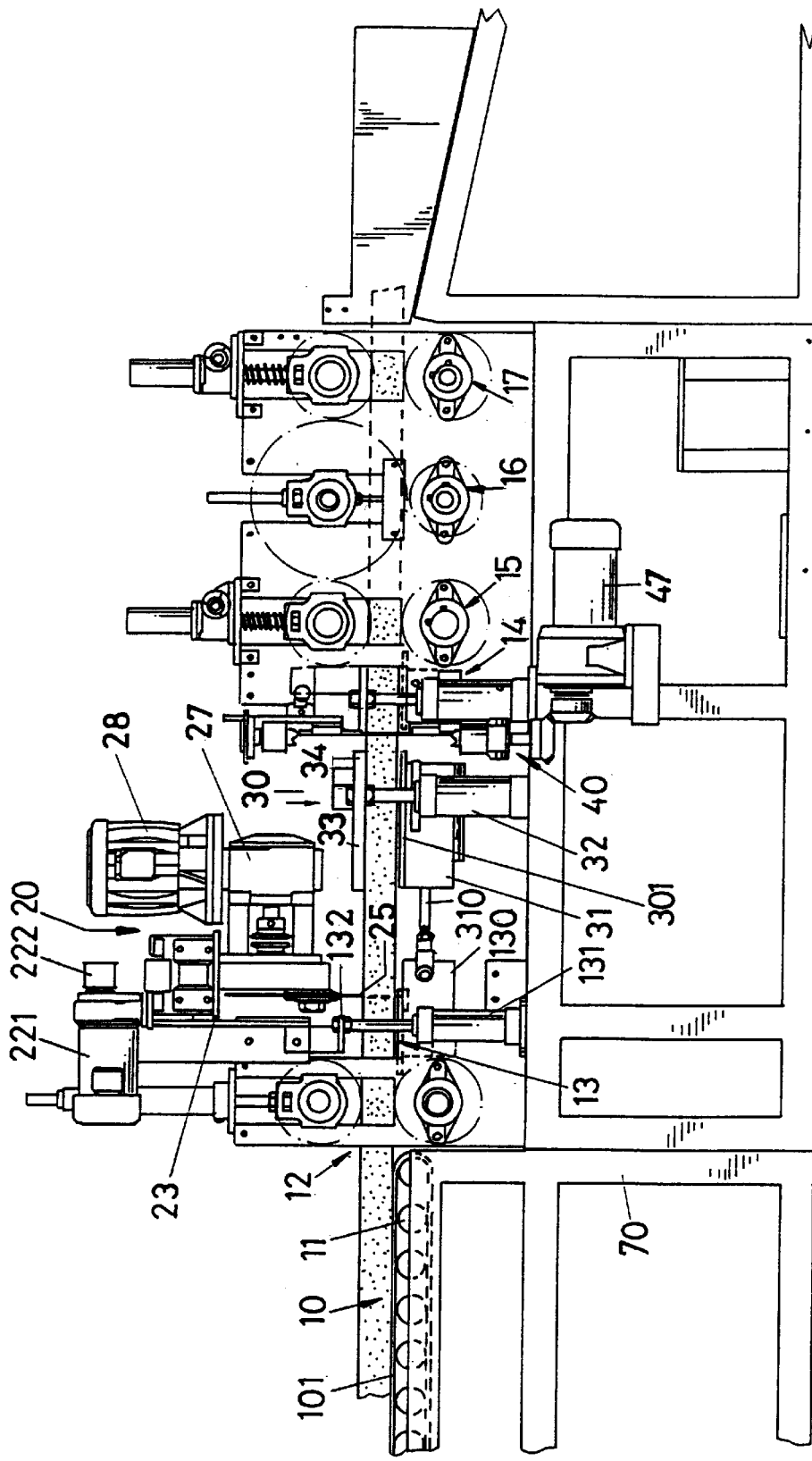
FIG. 14 is a side elevational view of the machine of the present invention, wherein the second compressing means is positioning the second plastic plate which is being fused with the first plastic plate by the heating blade.
Figure 15:
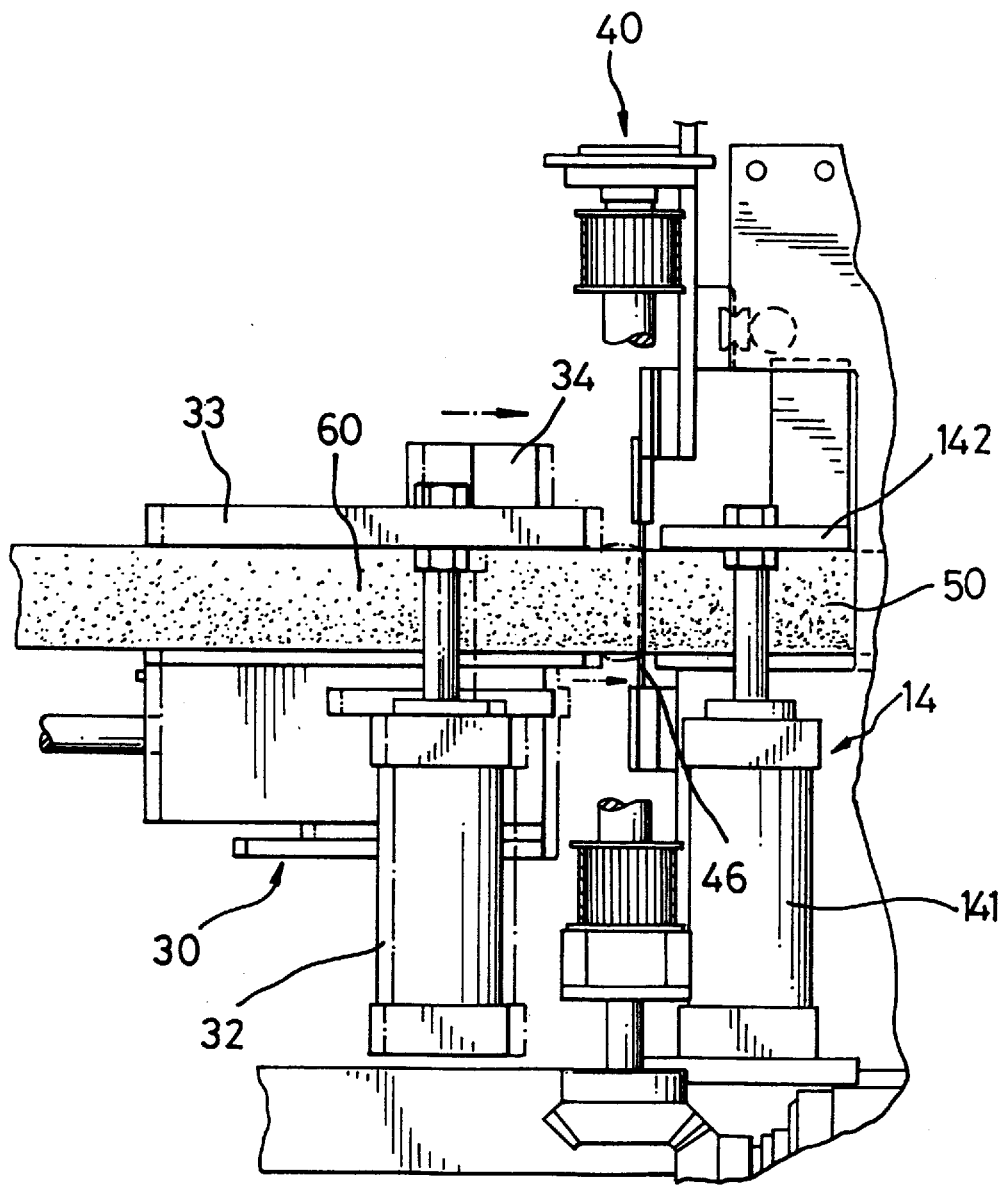
FIG. 15 is a side elevational view to show the second compressing means moves the front end of the second plastic plate to snugly contact the rear end of the first plastic plate when a fusing process is being performed.

Referring to FIG. 11, after the first plastic plate 50 has its rear irregular end cut, it is moved by the third compressing means 14 and the three sets or transportation assembly 15, 16, 17 till a position where the rear end of the first plastic plate 50 coincides with a vertical plane on which the heating blade 46 is located, and the second pressing plate 33 is lowered and moved to contact the rear end of the first plastic plate 50 at a rear end 34 or the second compressing plate 33 to ensure the position of the first plastic plate 50. Referring to FIG. 12, a second plastic plate 60 is fed by the feeding means 10 and the middle transmitting roller assembly 12, and positioned by the first compressing plate 132 so that a front irregular end of the second plastic plate 60 is also cut by the disk blade 25 in the same way as the first plastic plate 50 was cut. The second plastic plate 60 is moved after the front irregular end thereof is cut toward the fusing means 40 till the front end of the second plastic plate 60 contacts the rear end of the first plastic plate 50 as shown in FIG. 13. In FIG. 14, the second pressing plate 33 is again lowered to press the second plastic plate 60 and the movable cylinder 31 is then actuated to move the second plastic plate 60 toward the first plastic plate 50 slightly as shown in FIG. 15 so that the front end of the second plastic plate 60 snugly contacts the rear end of the first plastic plate 50. The front end of the second plastic plate 60 is allowed to be forcefully pushed so that the rear end of the second plastic plate 60 can be deformed slightly to contact the rear end of the first plastic plate 50. The heating blade 46 is then moved to fusingly connect the two respective ends of the first and the second plastic plate 50, 60.

By this way, the plastic plates 50, 60 can be connected to be a long and continuous plastic plate which will be scrolled up in subsequent steps which are conventional and thus not described here. The disk blade 25 is powerful enough to cut the plastic plates involving different contents with different stiffness.

Although the invention has been explained in relation to its preferred embodiment, it is to be understood that many other possible modifications and variations can be made without departing from the spirit and scope of the invention as hereinafter claimed.

What is claimed is:

1. A machine for cutting and fusing plastic plates, comprising:

a feeding means for feeding said plastic plates;

a first compressing device disposed next to said feeding means and having a first supporting plate being flush with said feeding means and at least one first compressing plate which is controlled by at least one first cylinder disposed beside said first supporting plate;

a cutting means disposed next to the first compressing means and having a frame transversely disposed above said first compressing means and a first motor disposed to one of two ends of said frame, a first pulley driven by said first motor and the other end of said frame having a second pulley disposed thereto so that a belt is movably reeved around said first pulley and said second pulley, said belt having a base member fixedly connected thereto which is connected to a disk blade connected to a second motor;

a second compressing means movably connected to said first supporting plate and having a second supporting plate being flush with said first supporting plate and a second compressing plate which is connected to at least one second cylinder disposed beside said second supporting plate, and a fusing means disposed next to the second compressing means and having two shafts and one of said shafts being driven by a third motor, two transmitting belts respectively reeved around said two shafts and each having a securing member disposed thereto so that a heating blade is connected between said two securing members.

2. The machine as claimed in claim 1 wherein said second supporting plate is disposed to a movable cylinder which has a cylinder rod connected to said first supporting plate.

3. The machine as claimed in claim 1 further comprising a third compressing means disposed adjacent said fusing means.

4. The machine as claimed in claim 3 further comprising a transmitting means disposed adjacent said third compressing means.

* * * * *